(12) United States Patent
Liu et al.

(10) Patent No.: US 11,632,059 B1
(45) Date of Patent: Apr. 18, 2023

(54) SUBMODULE TOPOLOGY CIRCUIT FOR MODULAR MULTILEVEL CONVERTER AND METHOD FOR CONTROLLING SAME

(71) Applicants: Yangzhou Power Supply Branch of State Grid Jiangsu Electric Power Co., Ltd., Jiangsu (CN); SOUTHEAST UNIVERSITY, Jiangsu (CN); STATE GRID JIANGSU ELECTRIC POWER CO., LTD., Jiangsu (CN); State Grid Corporation of China, Beijing (CN)

(72) Inventors: Zhong Liu, Jiangsu (CN); Yang Xu, Jiangsu (CN); Xin Zhan, Jiangsu (CN); Wu Chen, Jiangsu (CN); Peipei Li, Jiangsu (CN); Dajun Ma, Jiangsu (CN); Renjie Sui, Jiangsu (CN); Yu Chen, Jiangsu (CN)

(73) Assignees: Yangzhou Power Supply Branch of State Grid Jiangsu Electric Power Co., Ltd., Yangzhou (CN); SOUTHEAST UNIVERSITY, Nanjing (CN); State Grid Jiangsu Electric Power Co., Ltd., Beijing (CN); State Grid Corporation of China, Beijing (CN)

( * ) Notice: Subject to any disclaimer, the term of this patent is extended or adjusted under 35 U.S.C. 154(b) by 421 days.

(21) Appl. No.: 17/051,441

(22) PCT Filed: Nov. 4, 2019

(86) PCT No.: PCT/CN2019/115351
§ 371 (c)(1),
(2) Date: Oct. 29, 2020

(87) PCT Pub. No.: WO2021/012453
PCT Pub. Date: Jan. 28, 2021

(30) Foreign Application Priority Data

Jul. 23, 2019 (CN) .......................... 201910666334.5

(51) Int. Cl.
*H02M 7/145* (2006.01)
*H02M 7/483* (2007.01)
(Continued)

(52) U.S. Cl.
CPC ......... *H02M 7/4835* (2021.05); *H02M 1/325* (2021.05); *H02M 7/145* (2013.01); *H02M 7/53871* (2013.01)

(58) Field of Classification Search
CPC .... H02M 7/4835; H02M 1/325; H02M 7/145; H02M 7/53871
See application file for complete search history.

(56) References Cited

U.S. PATENT DOCUMENTS

| | | | |
|---|---|---|---|
| 2018/0109202 A1* | 4/2018 | Marquardt | H02P 9/006 |
| 2019/0131885 A1* | 5/2019 | Dorn | H02M 1/32 |
| 2023/0024492 A1* | 1/2023 | Arazm | H02M 7/4835 |

FOREIGN PATENT DOCUMENTS

| | | |
|---|---|---|
| CN | 104167912 A | 11/2014 |
| CN | 204633632 U | 9/2015 |

(Continued)

*Primary Examiner* — Adolf D Berhane (57) ABSTRACT

The present disclosure relates to a submodule topology circuit for a modular multilevel converter and a method for controlling same. The submodule topology comprises an inlet port and an outlet port, at least two half-bridge submodules, a plurality of first switching devices, a plurality of thyristors and a plurality of diodes, wherein the at least two half-bridges are connected in series and are provided between the inlet port and the outlet port, and each of the half-bridge submodules is provided with an input port, a first output port and a second output port.

16 Claims, 5 Drawing Sheets

(51) Int. Cl.
*H02M 1/32* (2007.01)
*H02M 7/5387* (2007.01)

(56) References Cited

FOREIGN PATENT DOCUMENTS

CN 104993683 A 10/2015
CN 105119511 A 12/2015
EP 3211784 A1 * 8/2017 .............. H02M 1/32

* cited by examiner

FIG. 5

SUBMODULE TOPOLOGY CIRCUIT FOR MODULAR MULTILEVEL CONVERTER AND METHOD FOR CONTROLLING SAME

The present application claims the benefit of the priority of Chinese patent application No. 201910666334.5 filed on Jul. 23, 2019, the contents of which are incorporated herein by reference.

FIELD OF THE INVENTION

The present disclosure relates to the field of protective control of DC transmission and distribution of power systems, for example, a submodule topology circuit for a modular multilevel converter and a method for controlling the same.

BACKGROUND OF THE INVENTION

With the development of new energy power generation and continuous increase of DC load, the applications of DC transmission and distribution network and AC-DC hybrid distribution network get more and more attention. The modular multilevel converter (MMC), which has simple modular structure, good scalability, low switching frequency, low loss, good harmonic characteristics and power quality regulation capability, is welcomed by domestic and foreign scholars and widely used in DC transmission systems and DC distribution systems. The MMC of the traditional half-bridge submodule structure uses a small number of devices and has low cost and loss. However, it cannot quickly isolate and ride through the short circuit fault on the DC side of the MMC. In such case, system paralysis would eventually occur and the MMC would be destroyed, resulting in huge cost losses.

Subsequently, some MMC submodule topologies with fault ride-through capability are proposed.

For example, Chinese patent application No. CN201410400214.8 proposes a submodule structure with hybrid half-bridge/full-bridge configuration. The full-bridge submodule is configured to realize self-blocking when the DC line of the converter fails. However, the full-bridge submodule has a greater number of switching devices and thus has high cost and high loss.

Chinese patent application No. CN201510416707.5 proposes an MMC submodule topology which involves fewer devices. However, it has weaker fault current blocking capability when the fault current reverses.

Chinese patent application No. CN201520350619.5 proposes a submodule topology. It has good fault current blocking capability, and each submodule has one less switching device than that of the full-bridge structure. However, the submodule topologies proposed in these patent documents only consider the fault current blocking capability, and are oblivious to the damage caused by the large fault current flowing through the switching devices, which may result in low reliability of the converter.

The applicant filed a patent application No. 2015105433494, publication No. CN105119511A, and entitled MMC SUBMODULE WITH FAULT BLOCKING CAPABILITY ON DC SIDE to SIPO on Aug. 28, 2015. In this application, a modular implementation (specific technical solutions are omitted) is proposed for the purpose of short-circuit current blocking on the DC side in a timely and complete manner, simple structure, few required devices and high integration. The proposed MMC submodule topology has certain short-circuit fault ride-through capability on the DC side; however, the topology of the MMC submodule has the following problems.

1. Regardless of whether the fault current is forward or reverse, the fault current will flow through the anti-parallel diode in the MMC power switch submodule, which can easily cause damage to the MMC power switch submodule and reduce the reliability of the converter.

2. The withstand voltage of the switching device $T_3$ and the diode $D_8$ in the circuit is twice the withstand voltage of the switching device in the half-bridge module, that is, twice the voltage of the capacitor of the submodule. Therefore, the MMC submodule topology circuit needs a switching device with a higher voltage level or a plurality of switching devices arranged in series, which increases the configuration cost, increases the configuration difficulty, and cannot truly realize the characteristics of modularization.

3. When the short-circuit fault current on the DC side is reversed, only the two submodule capacitors $C_1$ and $C_2$ are connected in series to the MMC bridge arm, and $C_3$ and $C_4$ are bypassed. Therefore, the capability to suppress short-circuit fault current on the DC side of the MMC submodule topology circuit is weak.

SUMMARY OF THE INVENTION

The present disclosure provides a MMC submodule topology circuit with a high degree of modularity, higher reliability, and stronger capability of forward and reverse fault suppression of short-circuit current on the DC side, and being more balanced, and further provides a control method thereof.

In the first aspect, the MMC submodule topology circuit according to the present disclosure comprises an inlet port, an outlet port, at least two half-bridge submodules, a plurality of first switching devices, a plurality of thyristors and a plurality of diodes; wherein the at least two half-bridge submodules are connected in series and are provided between the inlet port and the outlet port, and each of the half-bridge submodules is provided with an input port, a first output port and a second output port; among two adjacent half-bridge submodules, one corresponding first switching device of the plurality of first switching devices is provided between the second output port of the front half-bridge submodule and the input port of the rear half-bridge submodule, a head-end first switching device of the plurality of first switching devices is provided between the input port of the first one of the at least two half-bridge submodules and the inlet port; among the two adjacent half-bridge submodules, one corresponding thyristor of the plurality of thyristors is provided between the second output port of the front half-bridge submodule and the first output port of the rear half-bridge submodule, a head-end thyristor of the plurality of thyristors is provided between the first output port of the first half-bridge submodule and the inlet port; the second output port of the last half-bridge submodule of the at least two half-bridge submodules is connected to a tail-end thyristor of the plurality of thyristors and a tail-end first switching device of the plurality of switching devices, wherein the tail-end thyristor and the tail-end first switching device are connected in parallel; among the two adjacent half-bridge submodules of the at least two half-bridge submodules, one corresponding diode of the plurality of diodes is provided between the first output port of the front half-bridge submodule and the second output port of the rear half-bridge submodule; a head-end diode of the plurality of diodes is provided between the inlet port and the second output port of the first half-bridge submodule of the at least two half-bridge submodules, a tail-end diode of the plurality of diodes is provided between the outlet port and the first output port of the last half-bridge submodule of the at least two half-bridge submodules.

In the second aspect, the present disclosure further provides a method of controlling a MMC submodule topology circuit, for controlling the MMC submodule topology circuit provided in the first aspect The method comprises: when the MMC is in normal operation, setting an initial state; blocking the gate trigger signal of the plurality of thyristors, and triggering the plurality of first switching devices to enter a conducting state and two second switching devices in each of the at least two half-bridge submodules to enter a complementary conduction state; detecting a fault signal, when a short-circuit fault on the DC side of the MMC is detected, blocking the trigger signal of the second switching devices in all the half-bridge submodules, and blocking the trigger signal of the plurality of first switching devices; detecting the direction of the short circuit fault on the DC side, and when the fault current is forward, triggering the plurality of thyristors to enter in a conducting state, the short-circuit current on the DC side enters from the inlet port and then flows through the plurality of thyristors and the capacitor in each of the at least two half-bridge submodules, detecting the value of the short-circuit fault current on the DC side until the value of the short-circuit fault current on the DC side becomes 0; when the short-circuit fault current on the DC side is reverse, blocking the trigger signal of the plurality of thyristors, the short-circuit fault current on the DC side enters from the outlet port and then flows through the plurality of diodes and the capacitor in each of the at least two half-bridge submodules; detecting the value of the fault current until the value of the short-circuit fault current on the DC side becomes 0.

BRIEF DESCRIPTION OF THE DRAWINGS

FIG. 5 is a control flow chart according to an embodiment of the present disclosure;
In the figures, $H_1, H_2 \ldots H_N$ are half-bridge submodules,
$C_{SM1}, C_{SM2} \ldots C_{SMN}$ are the capacitors in the half-bridge submodules,
$G_{11}, G_{12}, G_{21}, G_{22} \ldots G_{N1}, G_{N2}$ are the second switching devices in the half-bridge submodules,
$Q_1, Q_2 \ldots Q_N, Q_{N+1}$ are the first switching devices,
$VT_1, VT_2 \ldots VT_N, VT_{N+1}$ are thyristors,
$D_1, D_2, D_3 \ldots D_N, D_{N+1}$ are diodes,
X is the inlet port, Y is the outlet port;
The directions of arrows in FIGS. 3 and 4 indicate the direction of short-circuit fault current on the DC side.

DETAILED DESCRIPTION OF THE INVENTION

Figure 1:
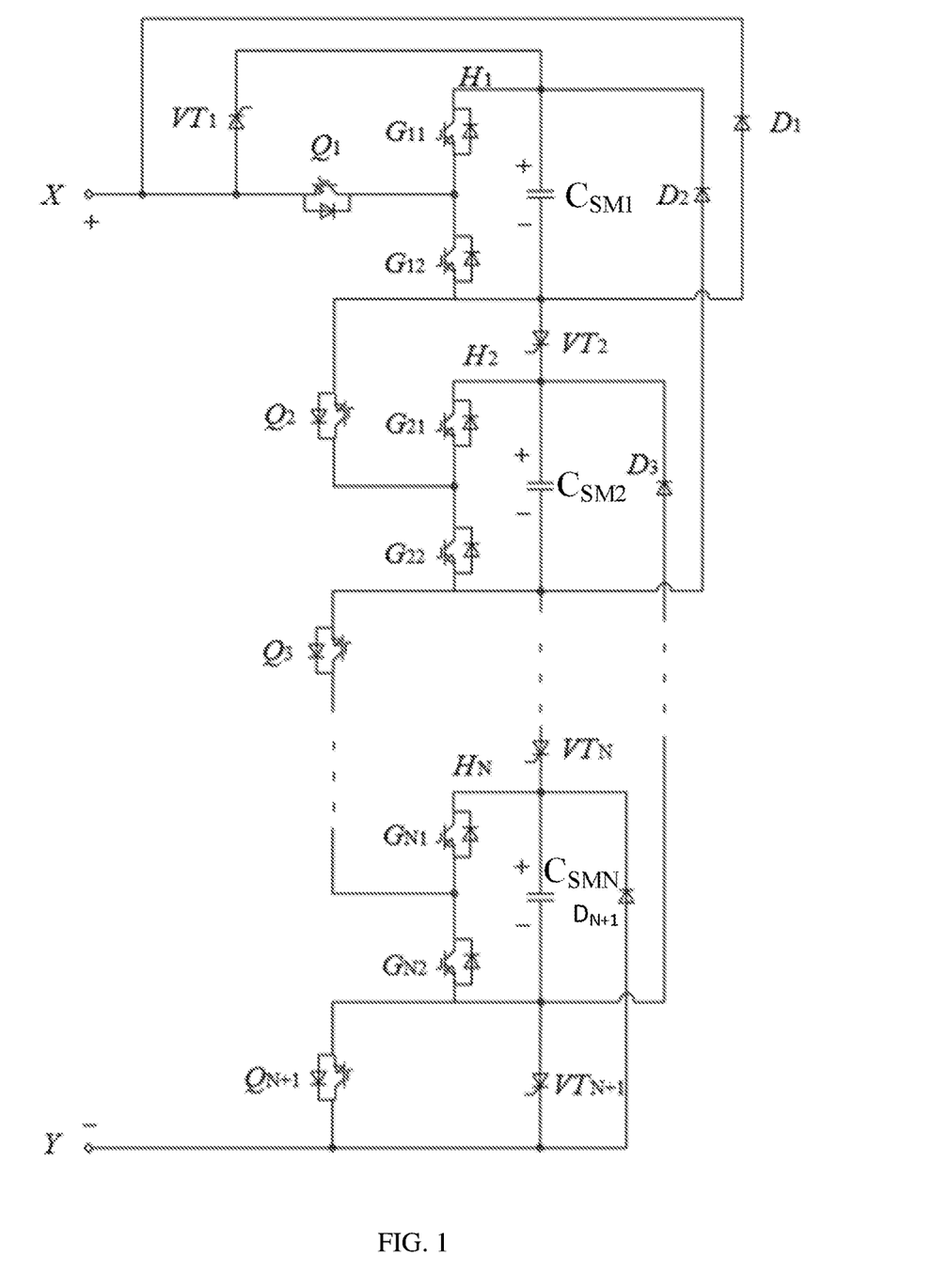
FIG. 1 is a schematic circuit diagram according to an embodiment of the present disclosure.

As shown in FIG. 1, the MMC submodule topology circuit according to an embodiment of the present disclosure comprises an inlet port X, an outlet port Y, at least two half-bridge submodules, a plurality of first switching devices, a plurality of thyristors, and a plurality of diodes; wherein the at least two half-bridge submodules are connected in series and are provided between the inlet port X and the outlet port Y, and each of the half-bridge submodules is provided with an input port, a first output port and a second output port.

Among two adjacent half-bridge submodules, one corresponding first switching device of the plurality of first switching devices is provided between the second output port of the front half-bridge submodule and the input port of the rear half-bridge submodule, a head-end first switching device of the plurality of first switching devices is provided between the input port of the first one of the at least two half-bridge submodules and the inlet port X.

Among two adjacent half-bridge submodules, one corresponding thyristor of the plurality of thyristors is provided between the second output port of the front half-bridge submodule and the first output port of the rear half-bridge submodule, a head-end thyristor of the plurality of thyristors is provided between the first output port of the first half-bridge submodule and the inlet port X.

The second output port of the last half-bridge submodule of the at least two half-bridge submodules is connected to a tail-end thyristor of the plurality of thyristors and a tail-end first switching device of the plurality of switching devices, wherein the tail-end thyristor and the tail-end first switching device are connected in parallel;

Among the two adjacent half-bridge submodules of the at least two half-bridge submodules, one corresponding diode of the plurality of diodes is provided between the first output port of the front half-bridge submodule and the second output port of the rear half-bridge submodule.

A head-end diode of the plurality of diodes is provided between the inlet port X and the second output port of the first half-bridge submodule of the at least two half-bridge submodules, a tail-end diode of the plurality of diodes is provided between the outlet port Y and the first output port of the last half-bridge submodule of the at least two half-bridge submodules.

Figure 2:
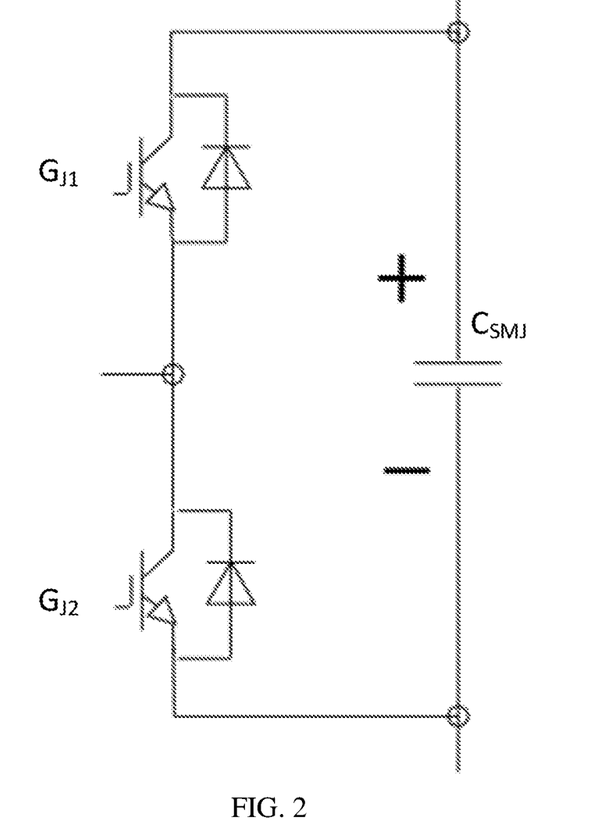
FIG. 2 is a schematic diagram of a half-bridge submodule according to an embodiment of the present disclosure.

In an embodiment, as shown in FIG. 2, each half-bridge submodule is composed of two second switching devices and a capacitor; wherein the emitter of the first second switching device $G_{J1}$ is connected to the collector of the second switching device $G_{J2}$ to form the input port of each half-bridge submodule.

The collector of the first second switching device $G_{J1}$ is connected to the anode of the capacitor $C_{SMJ}$ to form the first output port of each half-bridge submodule.

The emitter of the second switching device $G_{J2}$ is connected to the cathode of the capacitor $C_{SMJ}$ to form the second output port of each half-bridge submodule.

J may be 1~N, N≥2.

In an embodiment, a number of the at least two half-bridge submodules is N, and the at least two half-bridge submodules are $H_1, H_2 \ldots H_N$ in such sequence.

The number of the plurality of first switching devices is N+1, and the plurality of first switching devices are $Q_1, Q_2 \ldots Q_{N+1}$ in such sequence. The head-end first switching device is $Q_1$, and the tail-end first switching device is $Q_{N+1}$.

The number of the plurality of thyristors is N+1, and the plurality of thyristors are $VT_1, VT_2 \ldots VT_{N+1}$ in such sequence. The head-end thyristor is $VT_1$, and the tail-end thyristor is $VT_{N+1}$.

The number of the plurality of diodes is N+1, and the plurality of diodes are $D_1, D_2, D_3 \ldots D_{N+1}$ in such sequence. The head-end diode is $D_1$, and the tail-end diode is $D_{N+1}$.

Herein, N≥2.

In an embodiment, the emitter of the head-end first switching device $Q_1$ is connected to the inlet port X; and the collector of the head-end first switching device $Q_1$ is connected to the input port of the first half-bridge submodule $H_1$.

The emitter of the $J_{th}$ switching device $Q_J$ is connected to the second output port of the J-$1_{th}$ half-bridge submodule $H_{J-1}$, and the collector of the $J_{th}$ switching device $Q_J$ is connected to the input port of the $J_{th}$ half-bridge submodule $H_J$.

The emitter of the tail-end first switching device $Q_{N+1}$ is connected to the second output port of the $N_{th}$ half-bridge submodule $H_N$, and the collector of the tail-end first switching device $Q_{N+1}$ is connected to the outlet port Y.

J may be 2, 3 . . . N, N≥2.

In an embodiment, the anode of the head-end thyristor $VT_1$ of the plurality of thyristors is connected to the inlet port X, and the cathode of the head-end thyristor $VT_1$ is connected to the first output port of the first half-bridge submodule $H_1$.

The anode of the $J_{th}$ thyristor $VT_J$ is connected to the second output port of the J-$1_{th}$ half-bridge submodule $H_{J-1}$, and the cathode of the $J_{th}$ thyristor $VT_J$ is connected to the first output port of the $J_{th}$ half-bridge submodule $H_J$.

The anode of the tail-end thyristor $VT_{n+1}$ is connected to the second output port of the $N_{th}$ half-bridge submodule $H_N$, and the cathode of the tail-end thyristor $VT_{n+1}$ is connected to the outlet port Y.

J may be 2, 3 . . . N, N≥2.

In an embodiment, the cathode of the head-end diode $D_1$ is connected to the inlet port X, and the anode of the head-end diode $D_1$ is connected to the second output port of the first half-bridge submodule $H_1$.

The cathode of the $J_{th}$ diode $D_J$ is connected to the first output port of the J-$1_{th}$ half-bridge submodule $H_{J-1}$, and the anode of the $J_{th}$ diode $D_J$ is connected to the second output port of the $J_{th}$ half-bridge submodule $H_J$.

The cathode of the tail-end diode $D_{N+1}$ is connected to the first output port of the $N_{th}$ half-bridge submodule, and the anode of the tail-end diode $D_{N+1}$ is connected to the outlet port Y.

J may be 2, 3 . . . N, N≥2.

In an embodiment, the plurality of first switching devices may be insulated gate bipolar transistors (Insulated Gate Bipolar Transistor, IGBT) or metal-oxide semiconductor field effect transistors (Metal-Oxide-Semiconductor Field-Effect Transistor, MOSFET).

In an embodiment, the second switching devices may be IGBT or MOSFET.

Figure 5:
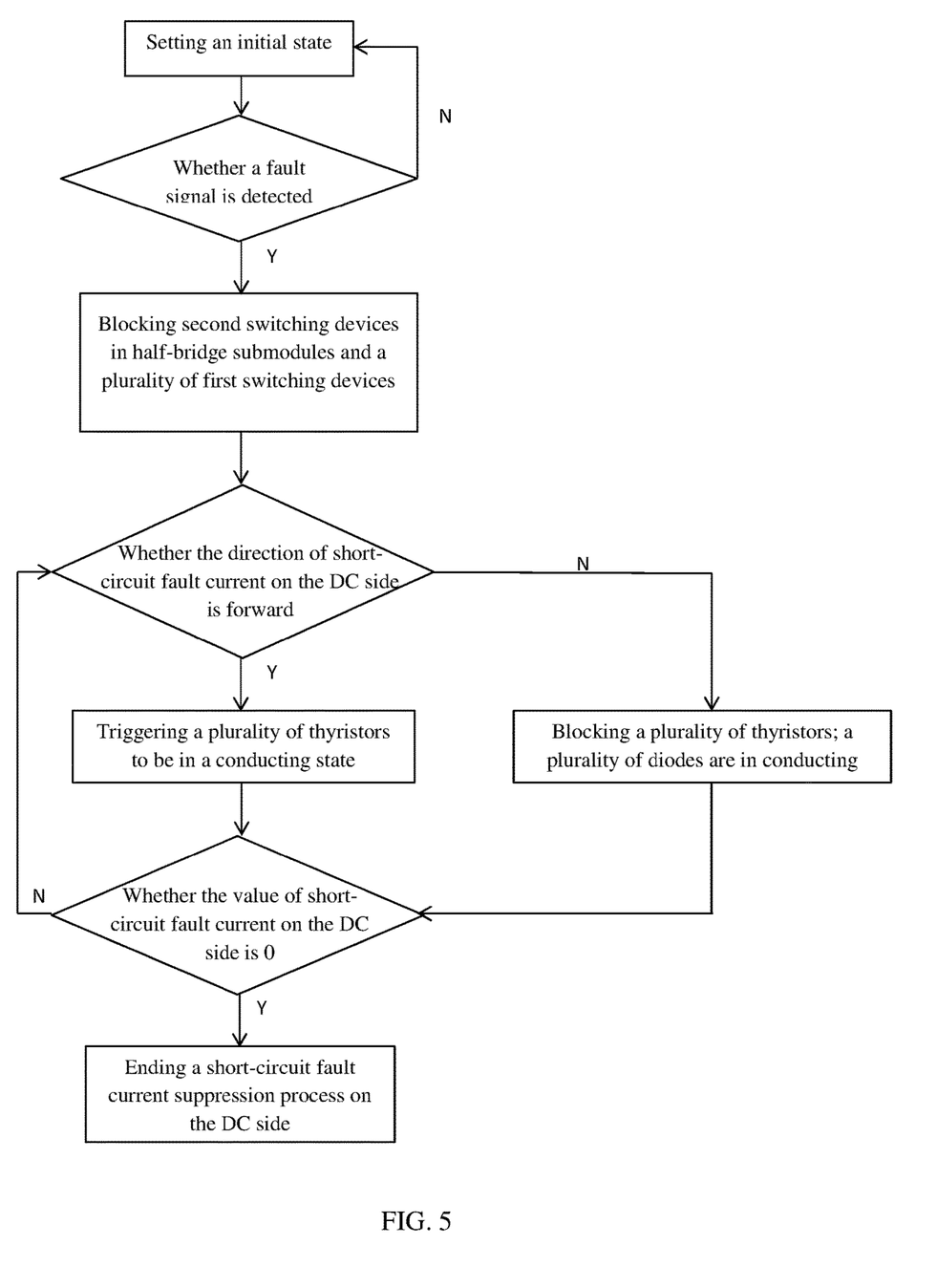

The present disclosure further provides a method of controlling MMC submodule topology circuit, as shown in FIG. 5, comprising steps (1) to (4).

In step (1), when the MMC is in normal operation, setting an initial state; blocking the gate trigger signal of the plurality of thyristors $VT_1, VT_2 \ldots VT_N, VT_{N+1}$, and triggering the plurality of first switching devices $Q_1, Q_2 \ldots Q_N, Q_{N+1}$ to enter a conducting state and two second switching devices in each of the at least two half-bridge submodules to enter a complementary conduction state.

In step (2), detecting a fault signal, and when a short-circuit fault on the DC side of the MMC is detected, blocking the trigger signal of the second switching devices in all the half-bridge submodules, and blocking the trigger signal of the plurality of first switching devices $Q_1, Q_2 \ldots Q_N, Q_{N+1}$; detecting the direction of the short circuit fault current on the DC side. If the direction of the fault current is forward, perform step (3); if the direction of the fault current is reverse, perform step (4).

Figure 3:
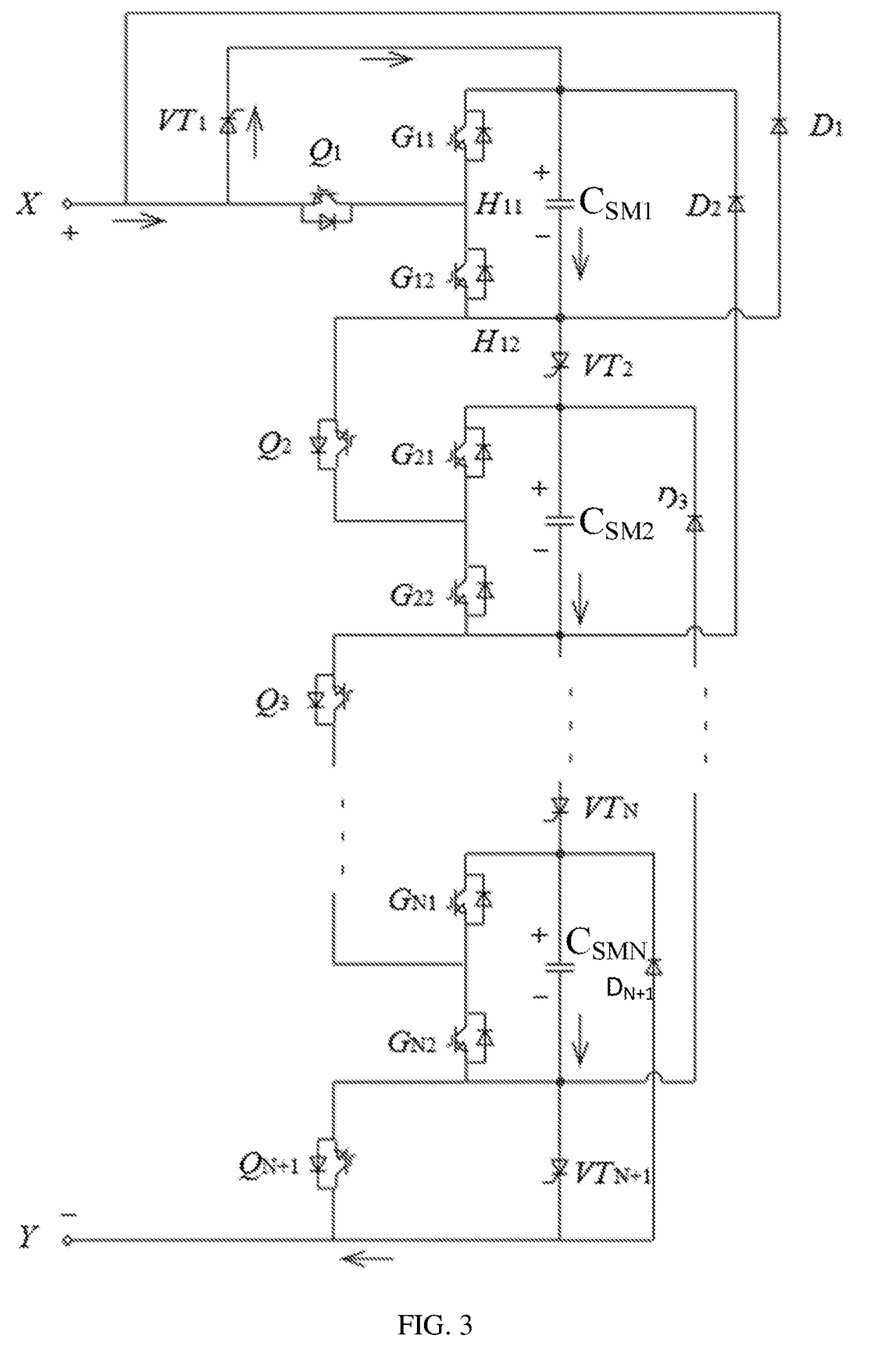
FIG. 3 is a schematic diagram according to an embodiment of the present disclosure, in which the fault current is forward.

In step (3), triggering all the thyristors $VT_1, VT_2 \ldots VT_N, VT_{N+1}$ to enter a conducting state, in which the short-circuit current on the DC side enters from the inlet port X and then flows through all the thyristors and the capacitors in all the half-bridge submodules, thereby effectively suppressing the short-circuit fault current on the DC side and avoiding the large current flowing through the switching device, as shown in FIG. 3. Further, detecting the value of the short-circuit fault current on the DC side until the value of the short-circuit fault current on the DC side becomes 0.

Figure 4:
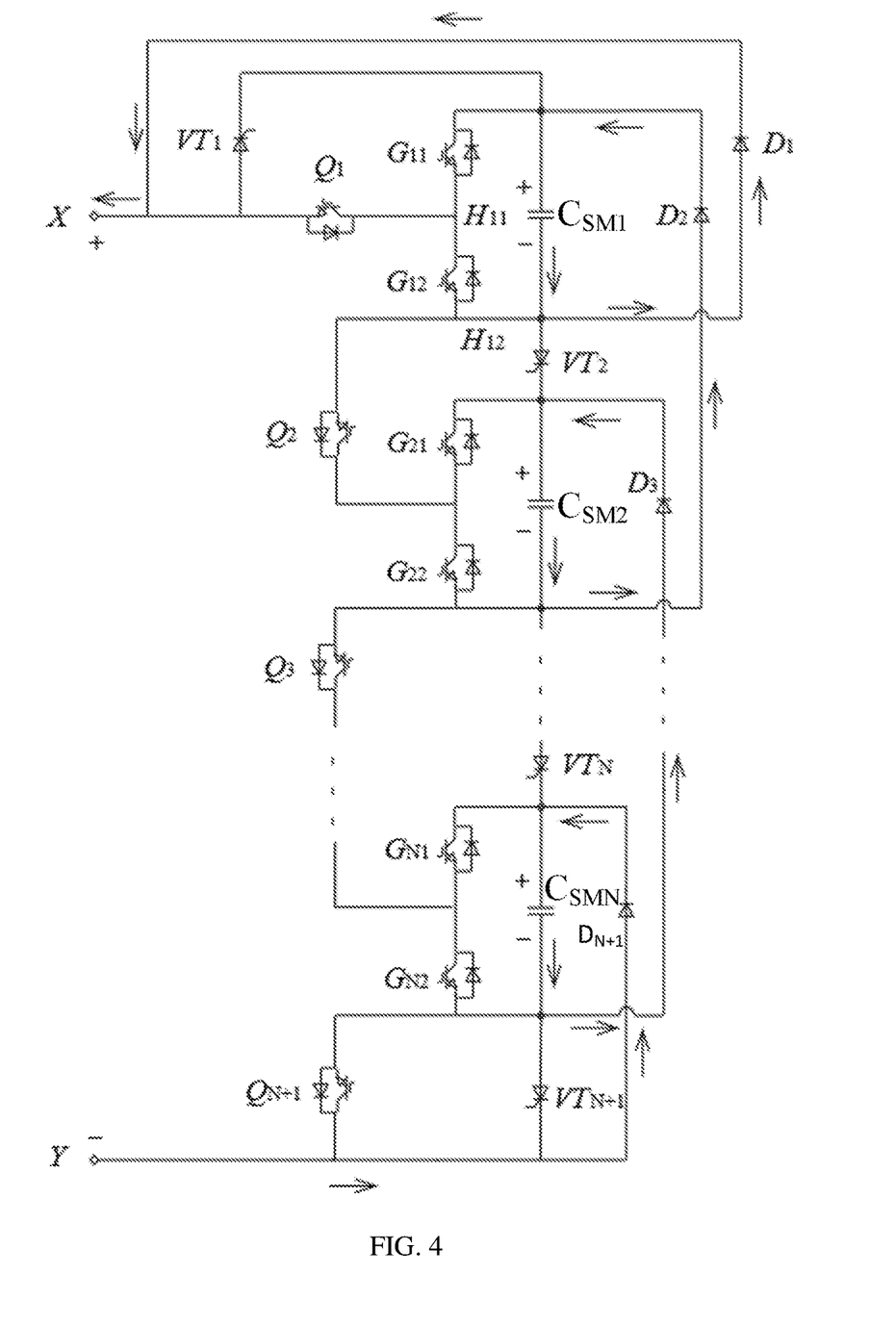
FIG. 4 is a schematic diagram according to an embodiment of the present disclosure, in which the fault current is reverse.

In step (4), blocking the trigger signals of all the thyristors $VT_1, VT_2 \ldots VT_N, VT_{N+1}$. In such case, all the thyristors are in the blocking state; the short-circuit fault current on the DC side enters from the outlet port Y and then flows through all the diodes and the capacitor in all the half-bridge submodules, thereby effectively suppressing the short-circuit fault current on the DC side, and avoiding the large current flowing through the switching device as shown in FIG. 4. Further, detecting the value of the short-circuit fault current on the DC side until the value of the short-circuit fault current on the DC side becomes 0.

In the event of a fault during the operation according to the present disclosure, no matter the fault current is forward or reverse, a large fault current can be prevented from flowing through the switching devices or diodes connected in inverse parallel, and the damage to the switching devices that is caused by the fault current can be avoided. All switching devices, thyristors and diodes have the same withstand voltage, i.e., the voltage of capacitor of the submodule, thus, the submodule topology has a high degree of modularity and is easier to configure. It has a certain cascade logic relationship, and is more convenient to achieve modularity. In the event of the fault, regardless of whether the fault current is forward or reverse, all the capacitors in the submodules will be put into the MMC bridge arm in series to suppress the fault current. Therefore, the MMC submodule topology has a strong Fault current suppression capability.

The invention claimed is:

1. A submodule topology circuit for a modular multilevel converter, comprising an inlet port, an outlet port, at least two half-bridge submodules, a plurality of first switching devices, a plurality of thyristors and a plurality of diodes;
   wherein the at least two half-bridge submodules are connected in series and are provided between the inlet port and the outlet port, and each of the half-bridge submodules is provided with an input port, a first output port and a second output port;
   among two adjacent half-bridge submodules, one corresponding first switching device of the plurality of first switching devices is provided between the second output port of a front half-bridge submodule and the input port of a rear half-bridge submodule, a head-end first switching device of the plurality of first switching devices is provided between the input port of a first half-bridge submodule of the at least two half-bridge submodules and the inlet port;
   among the two adjacent half-bridge submodules, one corresponding thyristor of the plurality of thyristors is provided between the second output port of the front half-bridge submodule and the first output port of the rear half-bridge submodule, a head-end thyristor of the plurality of thyristors is provided between the first output port of the first half-bridge submodule and the inlet port;

the second output port of a last half-bridge submodule of the at least two half-bridge submodules is connected to a tail-end thyristor of the plurality of thyristors and a tail-end first switching device of the plurality of switching devices, wherein the tail-end thyristor and the tail-end first switching device are connected in parallel;

among the two adjacent half-bridge submodules of the at least two half-bridge submodules, one corresponding diode of the plurality of diodes is provided between the first output port of the front half-bridge submodule and the second output port of the rear half-bridge submodule;

a head-end diode of the plurality of diodes is provided between the inlet port and the second output port of the first half-bridge submodule of the at least two half-bridge submodules, a tail-end diode of the plurality of diodes is provided between the outlet port and the first output port of the last half-bridge submodule of the at least two half-bridge submodules.

2. The topology circuit according to claim 1, wherein each half-bridge submodule is composed of two second switching devices and one capacitor; an emitter of a first second switching device is connected to a collector of a second second switching device to form the input port of each half-bridge submodule;

a collector of the first second switching device is connected to an anode of the capacitor to form the first output port of each half-bridge submodule;

an emitter of the second second switching device is connected to a cathode of the capacitor to form the second output port of each half-bridge submodule.

3. The topology circuit according to claim 1, wherein the at least two half-bridge submodules are $H_1, H_2 \ldots H_N$ arranged in such sequence, N being a number of the at least two half-bridge submodules;

the plurality of first switching devices are $Q_1, Q_2 \ldots Q_{N+1}$ arranged in such sequence, a number of the plurality of first switching devices is N+1, the head-end first switching device is $Q_1$, and the tail-end first switching device is $Q_{N+1}$;

the plurality of thyristors are $VT_1, VT_2 \ldots VT_{N+1}$ arranged in such sequence, a number of the plurality of thyristors is N+1, the head-end thyristor is $VT_1$, and the tail-end thyristor is $VT_{N+1}$;

the plurality of diodes are $D1, D_2, D_3 \ldots D_{N+1}$ arranged in such sequence, a number of the plurality of diodes is N+1, the head-end diode is $D_1$, and the tail-end diode is $DN_{N+1}$;

wherein, N≥2.

4. The topology circuit according to claim 3, wherein an emitter of the head-end first switching device is connected to the inlet port; and a collector of the head-end first switching device is connected to the input port of the first half-bridge submodule of the at least two half-bridge submodules;

an emitter of $J_{th}$ first switching device is connected to a second output port of $J-1_{th}$ half-bridge submodule, and a collector of $J_{th}$ first switching device is connected to an input port of $J_{th}$ half-bridge submodule;

an emitter of the tail-end first switching device is connected to a second output port of $N_{th}$ half-bridge submodule, and a collector of the tail-end first switching device is connected to the outlet port;

J is 2, 3 . . . N, N≥2.

5. The topology circuit according to claim 3, wherein an anode of the head-end thyristor of the plurality of thyristors is connected to the inlet port, and a cathode of the head-end thyristor is connected to the first output port of the first half-bridge submodule;

an anode of $J_{th}$ thyristor is connected to the second output port of $J-1_{th}$ half-bridge submodule, and a cathode of $J_{th}$ thyristor is connected to the first output port of $J_{th}$ half-bridge submodule;

an anode of the tail-end thyristor is connected to the second output port of $N_{th}$ half-bridge submodule, and a cathode of the tail-end thyristor is connected to the outlet port;

J is 2, 3 . . . N, N≥2.

6. The topology circuit according to claim 3, wherein a cathode of the head-end diode is connected to the inlet port, and an anode of the head-end diode is connected to the second output port of the first half-bridge submodule;

a cathode of $J_{th}$ diode is connected to the first output port of $J-1_{th}$ half-bridge submodule, and an anode of $J_{th}$ diode is connected to the second output port of $J_{th}$ half-bridge submodule;

a cathode of the tail-end diode is connected to the first output port of $N_{th}$ half-bridge submodule, and an anode of the tail-end diode is connected to the outlet port; J is 2, 3 . . . N, N≥2.

7. The topology circuit according to claim 1, wherein the plurality of first switching devices are insulated gate bipolar transistors or metal-oxide semiconductor field effect transistors.

8. The topology circuit according to claim 2, wherein the second switching devices are insulated gate bipolar transistors or metal-oxide semiconductor field effect transistors.

9. A method of controlling a submodule topology circuit for a modular multilevel converter, for controlling the submodule topology circuit for the modular multilevel converter of claim 1, the method comprising:

when the modular multilevel converter is in normal operation, setting an initial state: blocking a gate trigger signal of the plurality of thyristors, and triggering the plurality of first switching devices to enter a conducting state and two second switching devices in each of the at least two half-bridge submodules to enter a complementary conduction state;

detecting a fault signal, and when a short-circuit fault on DC side of the modular multilevel converter is detected, blocking a trigger signal of the second switching devices in each of the at least two half-bridge submodules, and blocking a trigger signal of the plurality of first switching devices;

detecting a direction of the short-circuit fault current on the DC side, when the direction of the short-circuit fault current on the DC side is forward, triggering the plurality of thyristors to enter a conducting state, in which the short-circuit current on the DC side enters from the inlet port and flows through the plurality of thyristors and the capacitors in the at least two half-bridge submodules, and detecting a value of the short-circuit fault current on the DC side until the value of the short-circuit fault current on the DC side becomes 0; and when the direction of the short-circuit fault current on the DC side is reverse, blocking a trigger signal of the plurality of thyristors in such a manner that the short-circuit fault current on the DC side enters from the outlet port and flows through the plurality of diodes and the capacitor in each of the at least two half-bridge submodules; and detecting the value of the short-circuit fault current on the DC side until the value of the short-circuit fault current on the DC side becomes 0.

10. A method of controlling a submodule topology circuit for a modular multilevel converter, for controlling the submodule topology circuit for the modular multilevel converter of claim 2, the method comprising:
   when the modular multilevel converter is in normal operation, setting an initial state: blocking a gate trigger signal of the plurality of thyristors, and triggering the plurality of first switching devices to enter a conducting state and two second switching devices in each of the at least two half-bridge submodules to enter a complementary conduction state;
   detecting a fault signal, and when a short-circuit fault on DC side of the modular multilevel converter is detected, blocking a trigger signal of the second switching devices in each of the at least two half-bridge submodules, and blocking a trigger signal of the plurality of first switching devices;
   detecting a direction of the short-circuit fault current on the DC side, when the direction of the short-circuit fault current on the DC side is forward, triggering the plurality of thyristors to enter a conducting state, in which the short-circuit current on the DC side enters from the inlet port and flows through the plurality of thyristors and the capacitors in the at least two half-bridge submodules, and detecting a value of the short-circuit fault current on the DC side until the value of the short-circuit fault current on the DC side becomes 0; and
   when the direction of the short-circuit fault current on the DC side is reverse, blocking a trigger signal of the plurality of thyristors in such a manner that the short-circuit fault current on the DC side enters from the outlet port and flows through the plurality of diodes and the capacitor in each of the at least two half-bridge submodules; and detecting the value of the short-circuit fault current on the DC side until the value of the short-circuit fault current on the DC side becomes 0.

11. A method of controlling a submodule topology circuit for a modular multilevel converter, for controlling the submodule topology circuit for the modular multilevel converter of claim 3, the method comprising:
   when the modular multilevel converter is in normal operation, setting an initial state: blocking a gate trigger signal of the plurality of thyristors, and triggering the plurality of first switching devices to enter a conducting state and two second switching devices in each of the at least two half-bridge submodules to enter a complementary conduction state;
   detecting a fault signal, and when a short-circuit fault on DC side of the modular multilevel converter is detected, blocking a trigger signal of the second switching devices in each of the at least two half-bridge submodules, and blocking a trigger signal of the plurality of first switching devices;
   detecting a direction of the short-circuit fault current on the DC side, when the direction of the short-circuit fault current on the DC side is forward, triggering the plurality of thyristors to enter a conducting state, in which the short-circuit current on the DC side enters from the inlet port and flows through the plurality of thyristors and the capacitors in the at least two half-bridge submodules, and detecting a value of the short-circuit fault current on the DC side until the value of the short-circuit fault current on the DC side becomes 0; and
   when the direction of the short-circuit fault current on the DC side is reverse, blocking a trigger signal of the plurality of thyristors in such a manner that the short-circuit fault current on the DC side enters from the outlet port and flows through the plurality of diodes and the capacitor in each of the at least two half-bridge submodules; and detecting the value of the short-circuit fault current on the DC side until the value of the short-circuit fault current on the DC side becomes 0.

12. A method of controlling a submodule topology circuit for a modular multilevel converter, for controlling the submodule topology circuit for the modular multilevel converter of claim 4, the method comprising:
   when the modular multilevel converter is in normal operation, setting an initial state: blocking a gate trigger signal of the plurality of thyristors, and triggering the plurality of first switching devices to enter a conducting state and two second switching devices in each of the at least two half-bridge submodules to enter a complementary conduction state;
   detecting a fault signal, and when a short-circuit fault on DC side of the modular multilevel converter is detected, blocking a trigger signal of the second switching devices in each of the at least two half-bridge submodules, and blocking a trigger signal of the plurality of first switching devices;
   detecting a direction of the short-circuit fault current on the DC side, when the direction of the short-circuit fault current on the DC side is forward, triggering the plurality of thyristors to enter a conducting state, in which the short-circuit current on the DC side enters from the inlet port and flows through the plurality of thyristors and the capacitors in the at least two half-bridge submodules, and detecting a value of the short-circuit fault current on the DC side until the value of the short-circuit fault current on the DC side becomes 0; and
   when the direction of the short-circuit fault current on the DC side is reverse, blocking a trigger signal of the plurality of thyristors in such a manner that the short-circuit fault current on the DC side enters from the outlet port and flows through the plurality of diodes and the capacitor in each of the at least two half-bridge submodules; and detecting the value of the short-circuit fault current on the DC side until the value of the short-circuit fault current on the DC side becomes 0.

13. A method of controlling a submodule topology circuit for a modular multilevel converter, for controlling the submodule topology circuit for the modular multilevel converter of claim 5, the method comprising:
   when the modular multilevel converter is in normal operation, setting an initial state: blocking a gate trigger signal of the plurality of thyristors, and triggering the plurality of first switching devices to enter a conducting state and two second switching devices in each of the at least two half-bridge submodules to enter a complementary conduction state;
   detecting a fault signal, and when a short-circuit fault on DC side of the modular multilevel converter is detected, blocking a trigger signal of the second switching devices in each of the at least two half-bridge submodules, and blocking a trigger signal of the plurality of first switching devices;

detecting a direction of the short-circuit fault current on the DC side, when the direction of the short-circuit fault current on the DC side is forward, triggering the plurality of thyristors to enter a conducting state, in which the short-circuit current on the DC side enters from the inlet port and flows through the plurality of thyristors and the capacitors in the at least two half-bridge submodules, and detecting a value of the short-circuit fault current on the DC side until the value of the short-circuit fault current on the DC side becomes 0; and when the direction of the short-circuit fault current on the DC side is reverse, blocking a trigger signal of the plurality of thyristors in such a manner that the short-circuit fault current on the DC side enters from the outlet port and flows through the plurality of diodes and the capacitor in each of the at least two half-bridge submodules; and detecting the value of the short-circuit fault current on the DC side until the value of the short-circuit fault current on the DC side becomes 0.

14. A method of controlling a submodule topology circuit for a modular multilevel converter, for controlling the submodule topology circuit for the modular multilevel converter of claim 6, the method comprising:

when the modular multilevel converter is in normal operation, setting an initial state: blocking a gate trigger signal of the plurality of thyristors, and triggering the plurality of first switching devices to enter a conducting state and two second switching devices in each of the at least two half-bridge submodules to enter a complementary conduction state;

detecting a fault signal, and when a short-circuit fault on DC side of the modular multilevel converter is detected, blocking a trigger signal of the second switching devices in each of the at least two half-bridge submodules, and blocking a trigger signal of the plurality of first switching devices;

detecting a direction of the short-circuit fault current on the DC side, when the direction of the short-circuit fault current on the DC side is forward, triggering the plurality of thyristors to enter a conducting state, in which the short-circuit current on the DC side enters from the inlet port and flows through the plurality of thyristors and the capacitors in the at least two half-bridge submodules, and detecting a value of the short-circuit fault current on the DC side until the value of the short-circuit fault current on the DC side becomes 0; and when the direction of the short-circuit fault current on the DC side is reverse, blocking a trigger signal of the plurality of thyristors in such a manner that the short-circuit fault current on the DC side enters from the outlet port and flows through the plurality of diodes and the capacitor in each of the at least two half-bridge submodules; and detecting the value of the short-circuit fault current on the DC side until the value of the short-circuit fault current on the DC side becomes 0.

15. A method of controlling a submodule topology circuit for a modular multilevel converter, for controlling the submodule topology circuit for the modular multilevel converter of claim 7, the method comprising:

when the modular multilevel converter is in normal operation, setting an initial state: blocking a gate trigger signal of the plurality of thyristors, and triggering the plurality of first switching devices to enter a conducting state and two second switching devices in each of the at least two half-bridge submodules to enter a complementary conduction state;

detecting a fault signal, and when a short-circuit fault on DC side of the modular multilevel converter is detected, blocking a trigger signal of the second switching devices in each of the at least two half-bridge submodules, and blocking a trigger signal of the plurality of first switching devices;

detecting a direction of the short-circuit fault current on the DC side, when the direction of the short-circuit fault current on the DC side is forward, triggering the plurality of thyristors to enter a conducting state, in which the short-circuit current on the DC side enters from the inlet port and flows through the plurality of thyristors and the capacitors in the at least two half-bridge submodules, and detecting a value of the short-circuit fault current on the DC side until the value of the short-circuit fault current on the DC side becomes 0; and when the direction of the short-circuit fault current on the DC side is reverse, blocking a trigger signal of the plurality of thyristors in such a manner that the short-circuit fault current on the DC side enters from the outlet port and flows through the plurality of diodes and the capacitor in each of the at least two half-bridge submodules; and detecting the value of the short-circuit fault current on the DC side until the value of the short-circuit fault current on the DC side becomes 0.

16. A method of controlling a submodule topology circuit for a modular multilevel converter, for controlling the submodule topology circuit for the modular multilevel converter of claim 8, the method comprising:

when the modular multilevel converter is in normal operation, setting an initial state: blocking a gate trigger signal of the plurality of thyristors, and triggering the plurality of first switching devices to enter a conducting state and two second switching devices in each of the at least two half-bridge submodules to enter a complementary conduction state;

detecting a fault signal, and when a short-circuit fault on DC side of the modular multilevel converter is detected, blocking a trigger signal of the second switching devices in each of the at least two half-bridge submodules, and blocking a trigger signal of the plurality of first switching devices;

detecting a direction of the short-circuit fault current on the DC side, when the direction of the short-circuit fault current on the DC side is forward, triggering the plurality of thyristors to enter a conducting state, in which the short-circuit current on the DC side enters from the inlet port and flows through the plurality of thyristors and the capacitors in the at least two half-bridge submodules, and detecting a value of the short-circuit fault current on the DC side until the value of the short-circuit fault current on the DC side becomes 0; and when the direction of the short-circuit fault current on the DC side is reverse, blocking a trigger signal of the plurality of thyristors in such a manner that the short-circuit fault current on the DC side enters from the outlet port and flows through the plurality of diodes and the capacitor in each of the at least two half-bridge submodules; and detecting the value of the short-circuit fault current on the DC side until the value of the short-circuit fault current on the DC side becomes 0.

\* \* \* \* \*